United States Patent
Hsueh (10) Patent No.: US 10,261,930 B2
(45) Date of Patent: Apr. 16, 2019

(54) SYSTEM, DEVICE AND METHOD FOR TRANSMITTING SIGNALS BETWEEN DIFFERENT COMMUNICATION INTERFACES

(71) Applicant: ATEN International Co., Ltd., New Taipei (TW)

(72) Inventor: Chao-Hsuan Hsueh, New Taipei (TW)

(73) Assignee: ATEN International Co., Ltd., New Taipei (TW)

( * ) Notice: Subject to any disclaimer, the term of this patent is extended or adjusted under 35 U.S.C. 154(b) by 50 days.

(21) Appl. No.: 15/295,528

(22) Filed: Oct. 17, 2016

(65) Prior Publication Data

US 2017/0116147 A1    Apr. 27, 2017

(30) Foreign Application Priority Data

Oct. 21, 2015 (TW) .............................. 104216872 U (51) Int. Cl.
| | |
|---|---|
| G06F 13/38 | (2006.01) |
| G06F 13/42 | (2006.01) |
| G06F 13/16 | (2006.01) |
| G06F 13/10 | (2006.01) |

(52) U.S. Cl.
CPC .......... *G06F 13/387* (2013.01); *G06F 13/107* (2013.01); *G06F 13/1673* (2013.01); *G06F 13/4286* (2013.01)

(58) Field of Classification Search
None
See application file for complete search history.

(56) References Cited

U.S. PATENT DOCUMENTS

| | | | |
|---|---|---|---|
| 8,462,759 B2* | 6/2013 | Shakiba | H04L 25/0264 370/344 |
| 2008/0201756 A1 | 8/2008 | Shakiba et al. | |
| 2010/0111100 A1 | 5/2010 | Baumer | |
| 2011/0243035 A1 | 10/2011 | Hall et al. | |

(Continued)

FOREIGN PATENT DOCUMENTS

| | | |
|---|---|---|
| CN | 101304393 A | 11/2008 |
| CN | 204257275 | 4/2015 |

(Continued)

*Primary Examiner* — Elias Mamo
(74) *Attorney, Agent, or Firm* — Chen Yoshimura LLP (57) ABSTRACT

This invention discloses a system, device and method for transmitting both non-video signals and video signals between different communication interfaces. The system includes a first communication interface, a buffer module, a second communication interface, and an emulator module. The first communication interface is coupled to an electronic device, for transmitting a first differential signal and a first auxiliary signal. The buffer module is coupled to the first communication interface. The second communication interface is coupled to the buffer module, for transmitting a second differential signal. The emulator module is coupled to the second communication interface via a hub. The emulator module receives a second auxiliary signal. Data exchange for the first auxiliary signal and the second auxiliary signal is performed via the second communication interface between the buffer module and the emulator module.

18 Claims, 6 Drawing Sheets

(56) References Cited

U.S. PATENT DOCUMENTS

| | | | |
|---|---|---|---|
| 2011/0310223 A1* | 12/2011 | Pai | H04N 9/8227 348/43 |
| 2013/0217274 A1* | 8/2013 | Bar-Niv | H01R 27/02 439/676 |
| 2013/0275629 A1 | 10/2013 | Hall | |
| 2014/0211095 A1* | 7/2014 | Dickens | H04N 5/38 348/723 |
| 2014/0244880 A1* | 8/2014 | Soffer | G06F 3/0227 710/300 |
| 2015/0091837 A1* | 4/2015 | Srinivasan | G06F 3/0488 345/174 |
| 2015/0288911 A1* | 10/2015 | Dickens | G09G 5/00 348/723 |

FOREIGN PATENT DOCUMENTS

| | | |
|---|---|---|
| TW | I310506 | 6/2009 |
| WO | 2013035098 | 3/2013 |

\* cited by examiner

SYSTEM, DEVICE AND METHOD FOR TRANSMITTING SIGNALS BETWEEN DIFFERENT COMMUNICATION INTERFACES

BACKGROUND OF THE INVENTION

Field of the Invention

This invention relates to a circuit and method for signal transmission, and in particular, it relates to signal transmission between different communication interfaces. It can support non-video and video signal transmission.

Description of Related Art

In the early days of computer systems, for connecting computers with external devices, a number of communication interfaces or connectors were used, such as PS/2 for mouse and keyboard, parallel ports (LPT port) for printers, RS233 for modems, etc. A problem with multiple kinds of interfaces is that driver programs must be installed, and they typically require a restart before use. These limitations are inconvenient to users. More recently, Universal Serial Bus (USB) is used to replace the above communication interfaces, which improves user friendliness and reduces incompatible communication interfaces. Today, USB is one of the commonly used communication interfaces.

USB is a serial interface bus standard used to connect computer systems and external peripheral devices, and as an input and output interface standard, it is widely used in connections between electronic devices, such as personal computers, mobile devices, digital TVs, printers, game devices, hard drives, etc., and they can have both data transmission and power supply functions. One major feature of USB is that it is hot-pluggable, i.e. it can be used as soon as it is plugged in. When the external device is connected to the computer via USB, the computer enumerates the external device, and load required driver programs, and communication can start without restarting the computer. With improvements in information technologies, the USB data transmission speed has increased. The transmission speed of only 1.5 Mbit/s for earlier USB 1.0 technologies had increased to 480 Mbit/s for USB 2.0 and 5 Gbps for USB 3.0, even up to 10 Gbps for USB 3.1. Common USB connectors are divided into A type and B type based on device requirements, and each type is further divided into micro and mini types. Based on USB 3.1 high speed transmission specification, the internal structure of Type C connectors can support high speed data transmission and power supply, as well as support Displayport. One feature of the exterior design of Type C connectors is that its upper and lower sides are identical, so the user does not need to distinguish between the "up" side and "down" side, and the connector can be plugged in with either side facing up.

With the advance of network technologies, Internet bas become an indispensable part of people's lives. The network brings convenience such as online shopping and communication across the ocean, etc. The large amount of data communication cannot be accomplished by individual servers, and multiple servers cooperating with each other are used to provide fast operations. To centrally manage servers, management personnel use KVM (keyboard, video, mouse) switches as control devices, which allows using one set of user terminal (keyboard, monitor, mouse) to control and manage multiple servers including their power supply and other settings. In addition, extenders are used to extend the signal transmission range, allowing remote control of servers, to improve space utilization efficiency.

Because Type-C USB connectors may potentially replace current Type-A and Type-B connectors, computers in the future may mainly used Type-C connectors. However, external devices using USB interface may still use current Type-A and Type-B connectors. Generally speaking, if an extender is to simultaneously support USB and Displayport devices, more connection lines need to be used to improve transmission speed, which increases cost. Take the example of extenders using fiber optic cables, USB signals need to be connected to 2 channels of optical transceiver module, Displayport high speed video signals require 2 or 4 channels of optical transceiver module, and the auxiliary channel (AUX) of Displayport also requires 2 channels of optical transceiver module.

SUMMARY

Accordingly, to improve the current technology, and taking cost into consideration, embodiments of the present invention provide an extender that simultaneously support USB peripheral devices and display devices, and in particular, they provide a method that allows the auxiliary signal channels (AUX) of the interfaces to be connected, without requiring additional two channels of optical transceiver module.

In one aspect, the present invention provides a circuit for transmitting both non-video signals and video signals. The circuit includes a first communication interface, a buffer module, a second communication interface, and an emulator module. The first communication interface is coupled to an electronic device, for transmitting a first differential signal and a first auxiliary signal. The buffer module is coupled to the first communication interface. The first differential signal and a first auxiliary signal are converted to a second differential signal by the buffer module, transmitted via the second communication interface. The emulator module is coupled to the second communication interface via a hub, wherein the emulator module receives a second auxiliary signal. Data exchange for the first auxiliary signal and the second auxiliary signal is performed via the second communication interface between the buffer module and the emulator module.

In another aspect, the present invention provides a device that supports both video interface and non-video interface. The device includes: a local module, a remote module, and connection lines coupled between the local module and the remote module, for transmitting signals. The local module is coupled to an electronic device, and includes a first buffer unit and a first transceiver module. The first buffer unit is coupled to a first non-video port and an auxiliary channel of a first video port of the electronic device. The first transceiver module is coupled to the first buffer unit. The remote module is coupled to multiple peripheral devices, and includes a second buffer unit and a second transceiver module. The second buffer unit is coupled to a second non-video port and an auxiliary channel of a second video port of the peripheral devices. The second transceiver module is coupled to the second buffer unit. When the connection lines are fiber optic connection lines, the first and second transceiver modules are optical transceiver modules.

In another aspect, the present invention provides a method for transmitting a video signal and a non-video signal, which includes: a local module receiving a first differential signal and a first auxiliary signal; transmitting the first differential signal and the first auxiliary signal to a buffer unit; the buffer unit generating a second differential signal based on the first differential signal and the first auxiliary signal; transmitting the second differential signal to a remote module, the remote module including an emulation device unit; coupling a second auxiliary signal to the emulation device unit; and exchanging data for the first auxiliary signal and the second auxiliary signal via the second differential signal between the buffer unit and the emulator device unit.

Preferably, the buffer module includes a virtual hub unit, coupled to receive the first differential signal; a host controller, coupled to receive the second differential signal; and a processor unit, coupled between the virtual hub unit and the host controller. The processor unit is also coupled to the first auxiliary signal channel of the electronic device. The emulator module is coupled to a port of the hub, and an upstream port of the hub is coupled to the host controller. The second auxiliary signal is coupled to the emulator module. The auxiliary channels are auxiliary channels of a Displayport interface.

Preferably, the first buffer unit includes: a virtual hub unit, coupled to a data differential channel of the first non-video port; a host controller, coupled to the first transceiver module; and a first processor unit, coupled between the virtual hub unit and the host controller and coupled to the auxiliary channel of the first video port. The second buffer unit includes: a physical hub unit, coupled to a data differential channel of the second non-video port; an emulation device unit, coupled to the physical hub unit; and a second processor unit, coupled to emulation device unit and coupled to the auxiliary channel of the second video port. The first non-video port and the second non-video port are Universal Serial Bus (USB) ports. The auxiliary channel of the first video port and the auxiliary channel of the second video port are auxiliary channels of a Displayport interface. The local module further includes a first signal separation circuit, coupled between the first transceiver module and the host controller, for separately processing the transmitting signal and receiving signal to generate a first separated signal. The remote module further includes a second signal separation circuit, coupled between the second transceiver module and the physical hub unit, for separately processing the transmitting signal and receiving signal to generate a second separated signal.

Preferably, the second differential signal includes two types of packets, including: converted first packets, wherein data in the first packets are unrelated to data of packets of the first differential signal; and forwarded second packets, wherein data in the second packets are the same as data of the packets of the first differential signal. The buffer module transmits the converted first packets via the second differential signal using emulated specific scheduling, the converted first packets including data of the first auxiliary signal.

Preferably, the second differential signal is separately processed by the signal separation circuit as receiving differential signal (D±RX) and transmitting differential signal (D±TX), where the signal separation circuit is coupled between the buffer unit and the remote module.

DETAILED DESCRIPTION OF PREFERRED EMBODIMENTS

Embodiments of the present invention are described below with reference to the drawings. The invention is described using preferred embodiments and different aspects. Detailed descriptions of the embodiments are provided below; however, those skilled in the relevant art will appreciate that some details may not be required to implement the invention. Further, some structures and their functions well known to those skilled in the art are not described in detail to simplify the description. The terms used in this disclosure should be given broadest reasonable interpretations, and understood in accordance with the descriptions below. Further, the drawings do not necessarily include all features of each embodiment, and they are not to scale.

First Embodiment

Figure 1:
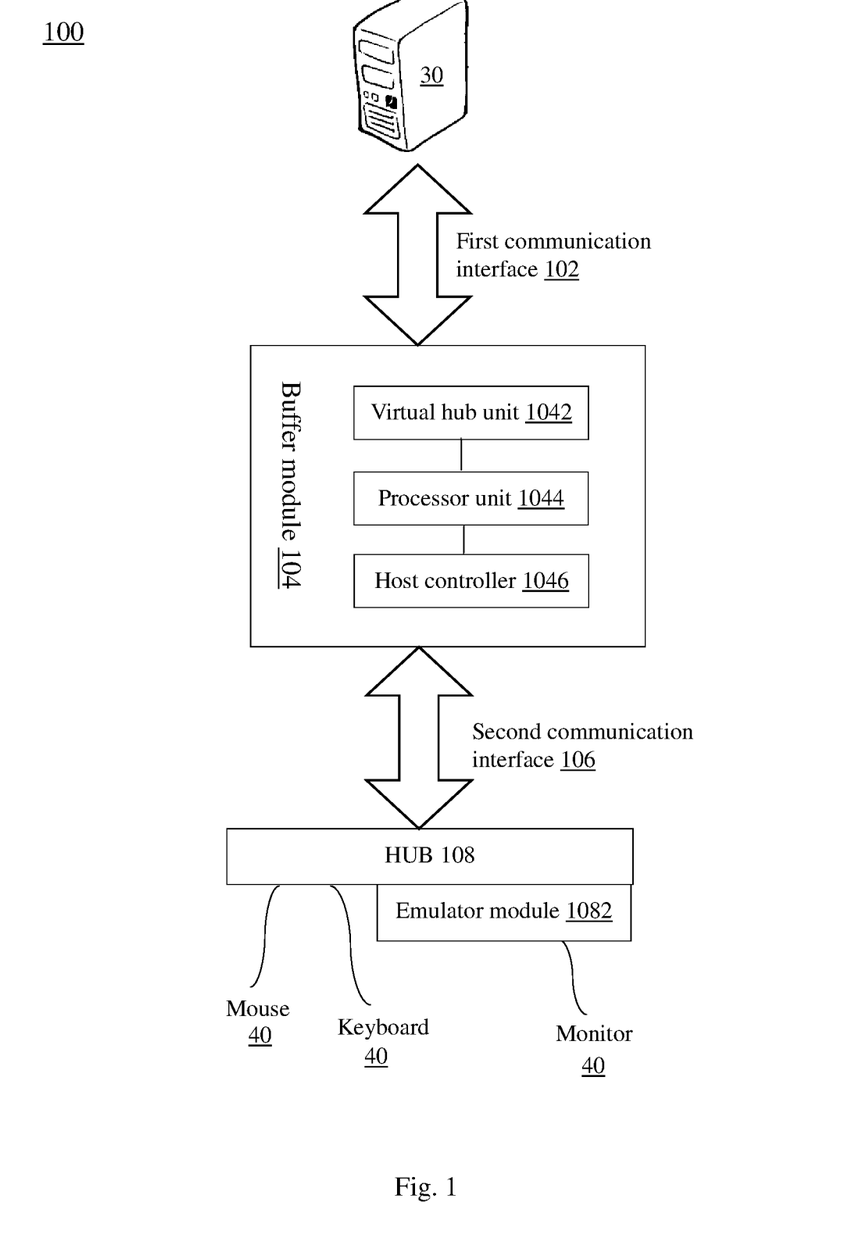
FIG. 1 is a system diagram showing a first embodiment of the present invention.

Refer to FIG. 1, which illustrates a system 100 for transmitting signals between different communication interfaces according to an embodiment of the present invention. In this embodiment, the system 100 includes a first communication interface 102, a buffer module 104, a second communication interface 106 and a hub 108. The buffer module 104 is coupled between the first communication interface 102 and the second communication interface 106, and is used to perform enumeration and scheduling for different peripheral devices (such as 40) or emulator modules (such as 1082), as will be described in more detail below. The first communication interface 102 is coupled to a host port of an electronic device 30 (such as a host computer), and the second communication interface 106 may be connected via the hub or hub unit 108 to multiple peripheral devices 40, such as keyboard, mouse, audio device, monitor, etc. Using this system, the electronic device 30 can control multiple peripheral devices 40 including their connection status and operation status, allowing the user to use the electronic device 30 to control different peripheral devices. Those skilled in the relevant art will appreciate that the electronic device 30 may include without limitation various pins such as sub(aux), D±, usbRX±, usbTX±, sspTX± and sspTX±. The peripheral device may include without limitation pins such as aux, D±, sspTX± and sspRX±.

Refer to FIG. 1, in a preferred embodiment, the first communication interface 102 is a USB interface, and in particular, a USB interface with a Type-C connector, which in additional to regular data transmission, can also transmit video and audio signals. The first communication interface 102 is coupled to a host port of an electronic device 30 (such as desktop computer, notebook computer, tablet computer, etc.), for providing and transmitting non-video signals (such as USB signals). In another embodiment, the first communication interface 102 also provides and transmits auxiliary signal to the buffer module 104.

Figure 2:
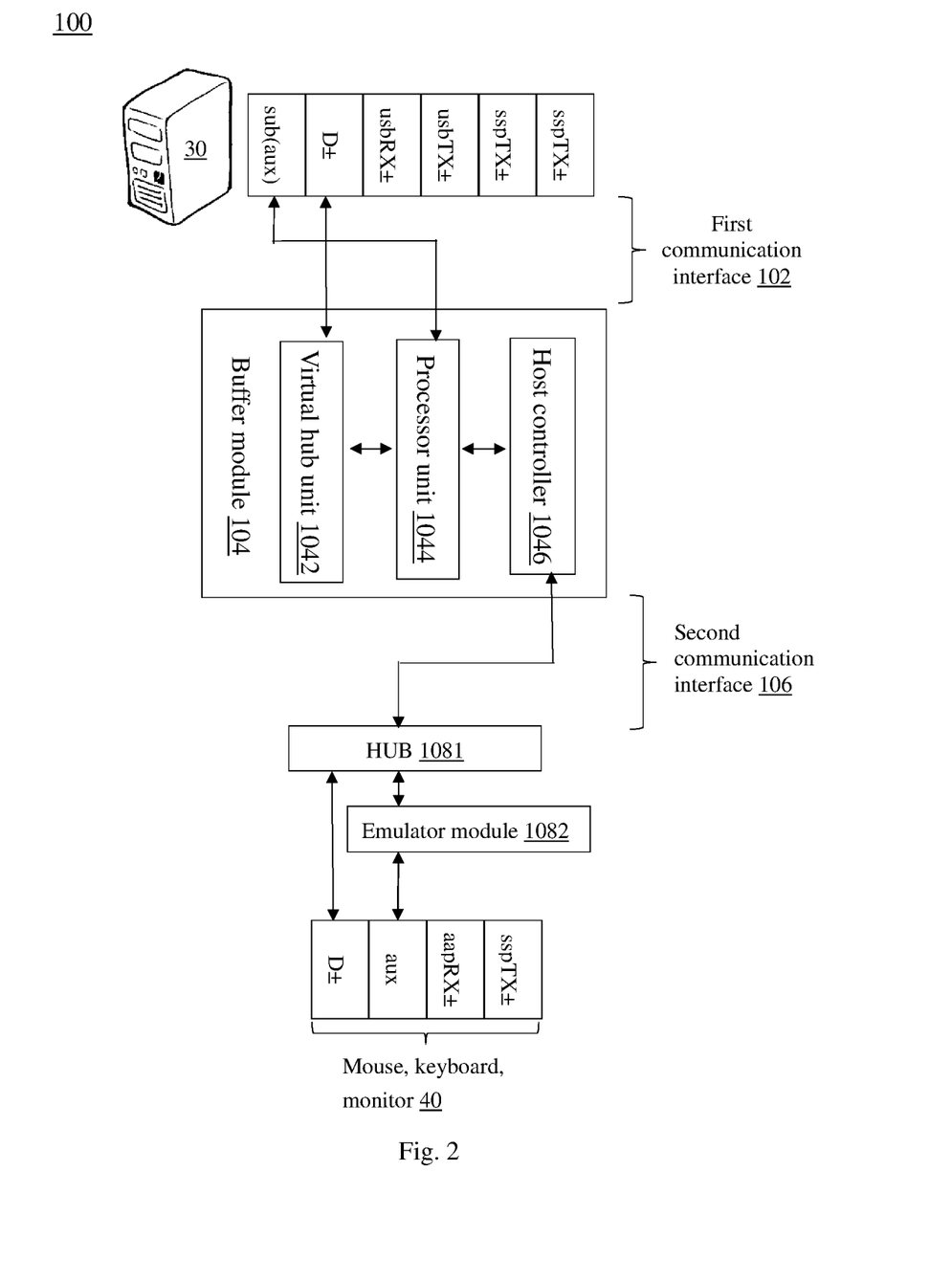
FIG. 2 is another diagram showing the first embodiment.

Refer to FIG. 2, which is another diagram showing the system 100. The buffer module 104 is coupled to the first communication interface 102. The buffer module 104 includes virtual hub 1042, host controller 1046 and processor unit 1044. The virtual hub 1042 is coupled to the first communication interface 102, the host controller 1046 is coupled to the second communication interface 106, and the processor unit 1044 is coupled between the virtual hub unit 1042 and the host controller 1046. More specifically, the virtual hub unit 1042 is coupled to the data differential channel D± of the host port of the electronic device 30, and the processor unit 1044 is coupled to the AUX channel of the host port of the electronic device 30. The host controller 1046 may be implemented in hardware, software, and/or firmware. It emulates the role of the host of the electronic device 30, and via the hub 108, performs enumeration, data collection and analysis for the peripheral devices 40. In some embodiments, the host controller 1046 also includes an internal memory, for storing and retrieving data and commands to be executed by the processor unit 1044.

The second communication interface 106 is coupled to the buffer module 104. The second communication interface 106 may be, without limitation, USB communication interfaces, including versions 2.0 and 3.0, As shown in FIG. 2, in this embodiment, multiple external peripheral devices 40 (such as mouse, keyboard, monitor, etc.) are coupled to the second communication interface 106 via the physical hub 1081. The physical hub 1081 is coupled to the data differential channel D± of the peripheral device 40. In this embodiment, the emulator module 1082 is coupled to the auxiliary channel (AUX) of the external peripheral device 40. In this embodiment, the emulator module 1082 is independently coupled to the port of the hub 1081, as shown in FIG. 2; if the external peripheral device 40 is a USB device such as mouse or keyboard, the data differential signal D± does not need to go through the emulator module 1082, and can be directly transmitted to the data differential signal D± of the electronic device 30 via the physical hub 1081, the second communication interface 106, and the first communication interface 102. If the external peripheral device 40 is a display monitor, then the auxiliary signal is transmitted to the auxiliary channel of the electronic device 30 via the emulator module 1082, the physical hub 1081, the second communication interface 106, and the first communication interface 102.

Second Embodiment

Figure 3:
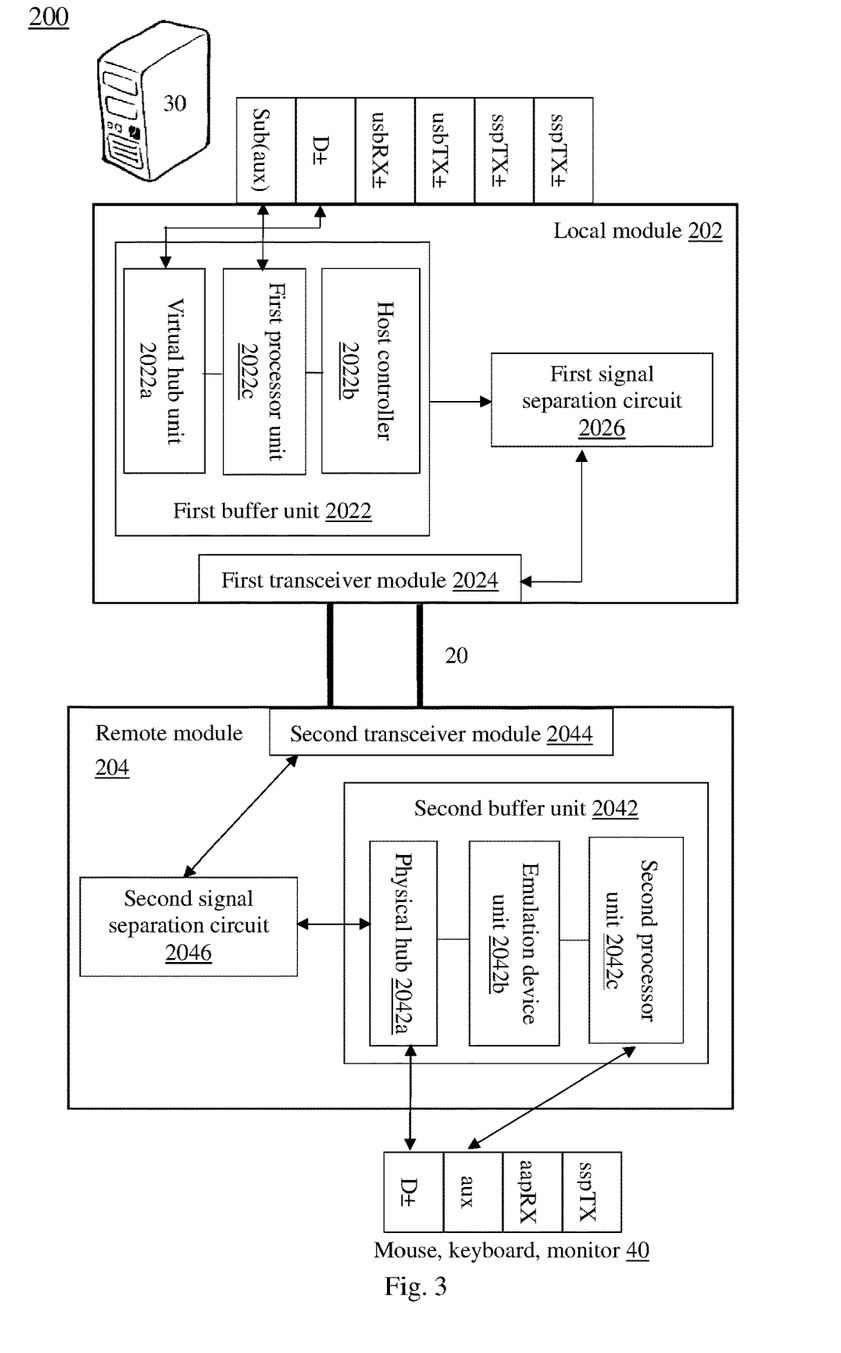
FIG. 3 is a diagram showing a second embodiment of the present invention.

Refer to FIG. 3, which illustrates remote control of multiple external peripheral devices according to an embodiment of the present invention. The device 200 includes local module 202 and remote module 204, which transmit signals to each other via connecting lines 20. The number of connecting lines 20 shown in FIG. 3 may vary based on practical need. In a preferred embodiment, the local module 202 and the remote module 204 are connected by two connecting lines 20, one for transmitting signals, the other for receiving signals. The connecting lines 20 may be wired or wireless connections. In a preferred embodiment, the connecting line 20 is a fiber optic cable or a CAT5 twisted pair cable. The local module 202 is coupled to the bus interface port of the electronic device 30, such as USB 2.0 or USB 3.0 ports. The local module 202 includes first buffer unit 2022 and first transceiver module 2024. The remote module 204 is coupled to the peripheral device 40, such as USB keyboard, USB mouse, monitor, etc. The remote module 204 includes second buffer unit 2042 and second transceiver module 2044. This device may be used in signal extenders, and further, may be used in KVM switches that control and manage remote computers, to improve space utilization efficiency.

The local module 202 is coupled via its first communication interface 102 (see FIG. 1) to the electronic device 30. The local module 202 includes first buffer unit 2022 and first transceiver module 2024. The first buffer unit 2022 includes virtual hub unit 2022a, host controller 2022b and first processor unit 2022c. The virtual hub unit 2022a is coupled to the first communication interface 102; more specifically, as shown in FIG. 3, the virtual hub unit 2022a is coupled to the data differential channel of the first communication interface 102. The host controller 2022b is coupled to the first transceiver module 2024, and the first processor unit 2022c is coupled between the virtual hub unit 2022a and the host controller 2022b, and also coupled to an auxiliary channel of the first communication interface 102.

The remote module 204 is coupled via its second communication interface 106 (see FIG. 1) to multiple external peripheral devices 40. The remote module 204 includes second buffer unit 2042 and second transceiver module 2044. The second buffer unit 2042 includes physical hub unit 2042a, emulation device unit 2042b and second processor unit 2042c. More specifically, as shown in FIG. 3, the physical hub unit 2042a is coupled to the second transceiver module 2044, the emulation device unit 2042b is coupled between the physical hub unit 2042a and the second processor unit 2042c, and the second processor unit 2042c is coupled to the auxiliary channel of the second communication interface 106 and to the emulation device unit 2042b.

In another embodiment, the local module 202 further includes a first signal separation circuit 2026, coupled between the first transceiver module 2024 and the host controller 2022b. The first signal separation circuit 2026 receives the data differential signal from the host controller, and separately transmits the transmitted and received signals of the data differential signal D± as receiving differential signals (D±RX) and transmitting differential signals (D±TX).

In another embodiment, the remote module 204 further includes a second signal separation circuit 2046, coupled between the second transceiver module 2044 and the physical hub unit 2042a, where the operation and function of the second signal separation circuit 2046 are similar to that of the first signal separation circuit. It can be seen that the first and second signal separation circuits can change half-duplex signal to and full-duplex signal and vice versa.

Figure 4:
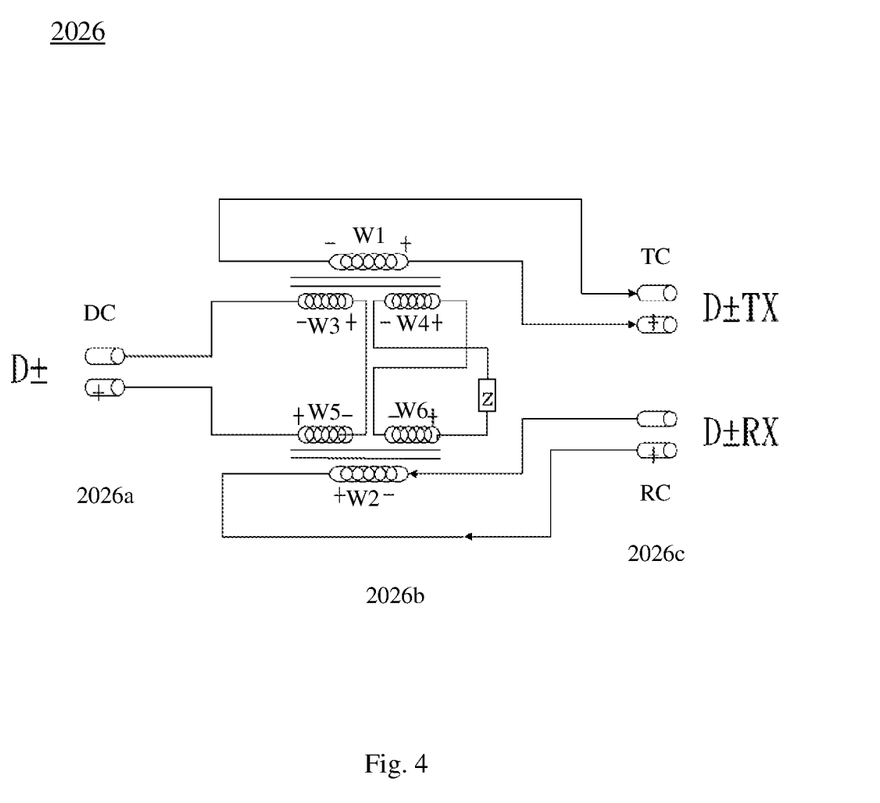
FIG. 4 is a diagram showing a signal separation circuit according to an embodiment of the present invention.

Refer to FIG. 4, the first signal separation circuit 2026 includes input unit 2026a (i.e. the D± end in the drawings), separation unit 2026b, and output unit 2026c. The input unit 2026a is coupled to the host controller 2022b of the first buffer unit 2022, to receive data differential signals. The input unit 2026a has a data channel DC. The separation unit 2026b is coupled to the input unit 2026a, and separately transmits the receiving differential signal (D±RX) and transmitting differential signal (D±TX) of the data differential signal D±. The output unit 2026c is coupled to the separation unit 2026b, and has a receiving channel (RC) and a transmitting channel (TC), for respectively communicating the receiving differential signal (D±RX) and the transmitting differential signal (D±TX). In the illustrated embodiment, the separation unit 2026b is an inductive coupling circuit, where the transmitting channel TC has first winding W1, the receiving channel RC has second winding W2, the data channel DC has third winding W3, fourth winding W4, fifth winding W5 and sixth winding W6. The first winding W1 is inductively coupled to the third and fourth windings W3 and W4, and the second winding W2 is inductively coupled to the fifth and sixth windings W5 and W6. More specifically, when the data differential signal is transmitted from the data channel DC to the transmitting channel TC, the third and fourth windings W3 and W4 induce a signal in the first winding W1; when the receiving differential signal (D±RX) is transmitted from the receiving channel RC to the data channel DC, the second winding W2 induces a signal in the fifth and sixth windings W5 and W6. The second signal separation circuit 2046 and its operation are similar to those of the first signal separation circuit 2026 and the descriptions are omitted.

Third Embodiment

Figure 5:
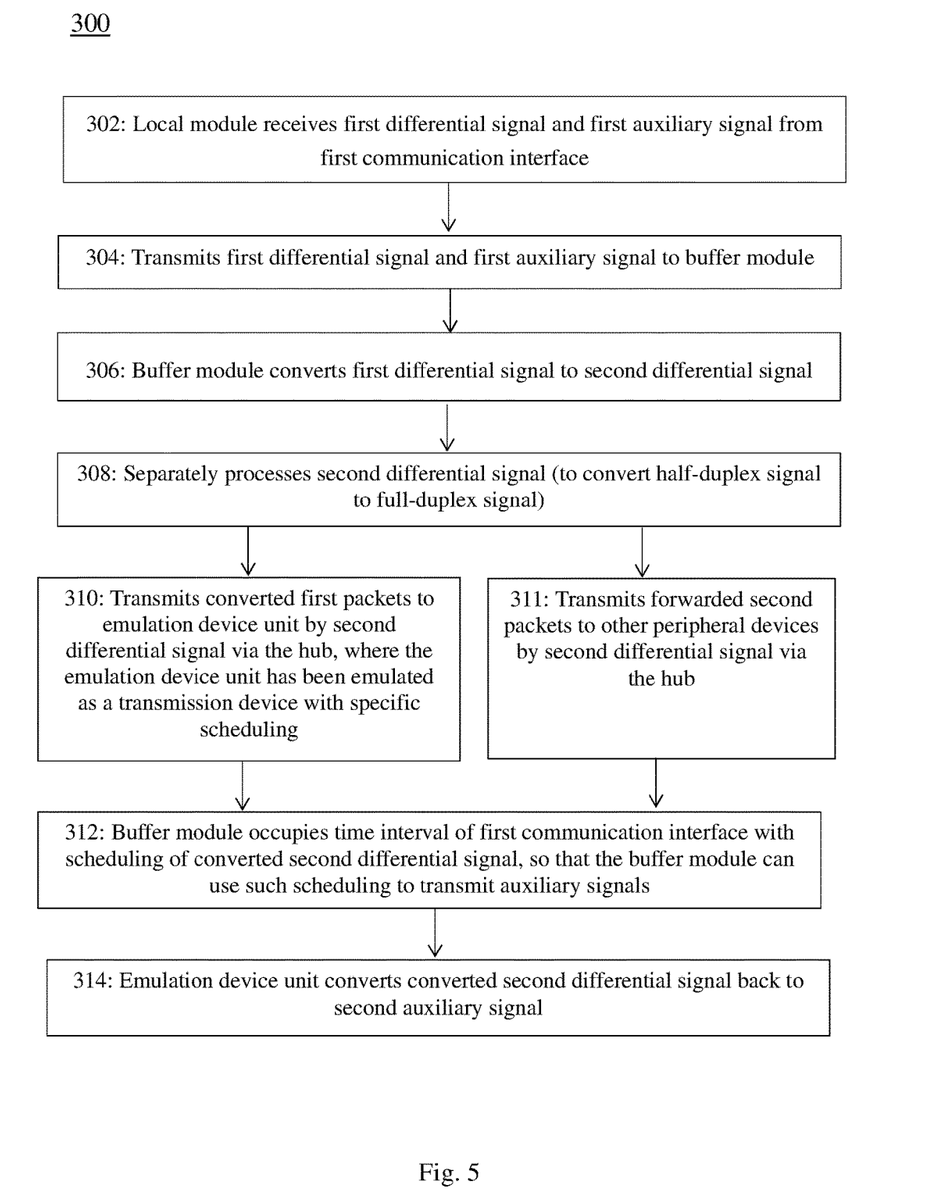
FIG. 5 illustrates a method flow according to an embodiment of the present invention.
Figure 6:
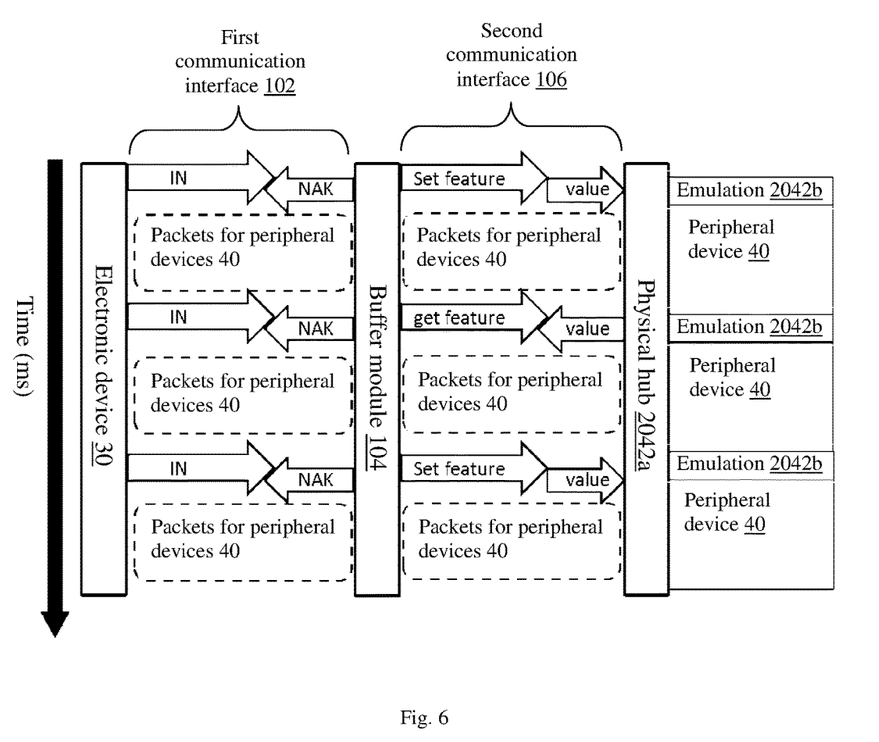
FIG. 6 illustrates packet transmission flow in an embodiment of the present invention.

Refer to FIG. 5, which shows a method for transmitting first differential signal and auxiliary signal according to an embodiment of the present invention. Unless otherwise specified, the various steps of the flowchart do not have to be performed in the illustrated order, i.e. the order of the steps can be changed and some steps can be performed simultaneously. Further, not all steps are required each time the method is performed, so some steps may be omitted in some embodiments. Other method flows may be used to implement the invention as well. The method 300 may be performed by the system 100 or the device 200. The description below uses the system 100 as an example, and components of device 200 may be used to perform the method when appropriate. Reference is also made to FIG. 6.

Step 302: The local module 202 receives a first differential signal and first auxiliary signal from the first communication interface 102. The local module 202 is coupled to the electronic device 30. The step of receiving the first differential signal includes the electronic device 30 performing enumeration for the emulator module 1082 (or the emulation device unit 2042b) and the peripheral devices 40.

Refer to FIG. 6, which shows the flow of packets in each time periods. In this preferred embodiment, the electronic device 30 first transmits an input (IN) packet to the emulator module 1082 (or the emulation device unit 2042b), which is first transmitted to the buffer module 104 (or buffer unit). The buffer module 104 temporarily performs flow control and sends a negative-acknowledgement signal (NAK) to the electronic device 30. Meanwhile, the buffer module 104 performs conversion for the emulator module 1082 (or the emulation device unit 2042b), and changes to sending a control transfer packet, i.e., it sends "set feature" packets and "value" packets to the emulator module 1082 (or the emulation device unit 2042b), where the values carried by the value packets are the data of the first auxiliary signal. This completes the first cycle. In the next cycle, the electronic device 30 sends an input (IN) packet to the emulator module 1082, which is first transmitted to the buffer module 104. The buffer module 104 sends a negative-acknowledgement signal (NAK) to the electronic device 30. Meanwhile, the buffer module 104 performs conversion for the emulator module 1082 and changes to sending a control transfer packet, i.e., it sends "get feature" packets to and receives "value" packets from the emulator module 1082 (or the emulation device unit 2042b); the value packets here are return packets, where the values carried by the value packets are the data of the second auxiliary signal. This completes the second cycle. The first cycle and the second cycle are both packet conversion for emulator module 1082 performed by the electronic device 30. In other time intervals, i.e. the time interval between the first cycle and the second cycle, the electronic device 30 transmits to the peripheral devices 40 originally intended packets, such as packets for bulk transfers, isochronous transfers, or interrupt transfers. These packets are first sent to the buffer module 104, and the buffer module 104 forwards the same packets to the peripheral devices 40. The first auxiliary signal mentioned above is from the auxiliary signal channel of the host port of the electronic device 30, which is transmitted to the buffer module 104 via the first communication interface 102. The second auxiliary signal is signal that exists between the emulator module 1082 and the peripheral devices 40 (in particular display devices).

As described above, the electronic device 30 periodically sends input (IN) packets to the emulator module 1082 (or the emulation device unit 2042b), and the reason is: the configuration descriptor and endpoint descriptor emulated by the emulator module 1082 (or the emulation device unit 2042b) via firmware determine the direction of data transmission and the manner of data transmission. If after analysis the emulator module 1082 is recognized as a human interface device (HID), then the interrupt transfer is used for the endpoint. Each endpoint of interrupt transfer will set an interval time, and the electronic device 30 will, based on the interval time, request interrupt transfer to the endpoint, and re-analyze the configuration descriptor. This is repeated, to repeat interrupt transfer according to the interval time. In the preferred embodiment, the interval time for the emulator module 1082 is 1 ms, i.e., the above steps repeat every 1 ms, in order to maintain the data transfer between the two communication interfaces.

Step 304: The first differential signal and the first auxiliary signal are transmitted to the buffer module 104 (or the first buffer unit 2022 and second buffer unit 2042). More specifically, the buffer module 104 includes virtual hub unit 1042, host controller 1046 and processor unit 1044, where the virtual hub unit 1042 is coupled to the data differential channel D± of the first communication interface 102, and the processor unit 1044 is coupled to the auxiliary channel of the first communication interface 102, as shown in FIGS. 1 and 2. In this embodiment, the first differential signal is transmitted from the data differential channel of the first communication interface 102 to the virtual hub unit 1042, then, sequentially transmitted to the processor unit 1044 and the host controller 1046. The auxiliary signal is directly transmitted to the processor unit 1044 and the host controller 1046, and it is not necessary to transmit it to the virtual hub 1042.

Step 306: the first differential signal is converted to the second differential signal by the buffer module 104, where the second differential signal includes the following two types of packets: The first type are first packets that are converted, and the data in these packets are unrelated to the data of packets of the first differential signal; the second type are second packets that are forwarded, and the data in these packets are the same as data in the packets of the first differential signal. Meanwhile, the auxiliary signal is also transmitted to the processor unit 1044 and the host controller 1046. The packet conversion rate and forwarding rate are adjusted depending on the different communication interfaces, which can be understood by those skilled in the art and is not described in detail here. In summary, the differential signals from the emulation device unit 2042b (or emulator module 1082) are converted, and the differential signals from the peripheral devices 40 are e forwarded. The dashed line boxes in FIG. 6 are the differential signals from the peripheral devices 40. In this embodiment, the converted first packets and the forwarded second packets are both transmitted via the second differential signals to the remote module 204 for subsequent processing.

Step 308: The second differential signals are separately processed. As shown in FIG. 3, the signal separation circuit (using the first signal separation circuit 2026 as an example, which applies to the second signal separation circuit 2046 as well) is coupled between the first buffer unit 2022 (or the buffer module 104) and the first transceiver module 2024. When required, the first signal separation circuit 2026 separately transmits the second differential signal as receiving differential signal (D±RX) and transmitting differential signal (D±TX), to conform to the specification of the downstream second communication interface 106. For example, before the separate processing, the second differential signal may be a USB 2.0 signal, and the second communication interface may use fiber optic transmission; because the former uses half-duplex transmission but the latter uses full-duplex transmission, the two are not compatible. Therefore, the signal separation circuit performs conversion between half-duplex and full-duplex transmissions for them. The signal separation circuit can change half-duplex signal to and full-duplex signal and vice versa. It should be noted that step 308 is optional and is performed based on practical need. For example, if the second differential signal is a USB 3.0 signal, which is full-duplex, then step 308 is not needed. In this embodiment, the converted second differential signal is transmitted to the remote module 204 for subsequent processing.

Step 310: The converted first packets are transmitted to the emulation device unit 2042b (or emulator module 1082) via the hub 1081, and the second auxiliary signal is coupled to the emulation device unit 2042b. The emulation device unit 2042b (or emulator module 1082) is emulated beforehand to be a transmission device with specific scheduling order, so that the converted second differential signal can transmit auxiliary channel data using this time interval of the scheduling. Those skilled in the art will understand that the scheduling setting is loaded in the emulation device unit 2042b (or emulator module 1082) by software or firmware.

Step 311: The forwarded second packets are transmitted to the other peripheral devices 40 via the hub 1081. Those skilled in the art will understand that steps 310 and 311 may be performed concurrently without any specific order.

Step 312: The buffer module 104 occupies the time interval of the first communication interface 102 with the scheduling of the converted second differential signal (which includes the first packets); this way, the buffer module 104 uses this scheduling to transmit the data of the auxiliary channel, as shown in FIG. 6. Thus, data exchange for the first auxiliary signal and the second auxiliary signal is done via the second communication interface 106 between the buffer module 104 and the emulation device unit 2042b (or the emulator module 1082).

Step 314: The emulation device unit 2042b (or the emulator module 1082) converts the converted second differential signal (which includes the first packets) back to the second auxiliary signal.

Using the above steps, the method 300 not only connects the auxiliary channel of the first communication interface 102 and the auxiliary channel of the second communication interface 106 and thereby to exchange auxiliary signals, but also achieves the specific scheduling of the differential signals via the second buffer unit 2042 (or the emulator module 1082), so that the auxiliary channel data is transmitted by the specific scheduling. Thus, the auxiliary channel data and the data of the other peripheral devices can be transmitted by their own schedule and do not interfere with each other.

In summary, embodiments of the present invention provide system, device and method for transmitting video data and non-video data between different communication interfaces. By using the buffer module to convert and forward data packets, and by using emulation device unit (or emulator module) to generate specific scheduling, the auxiliary channels of the different communication interfaces are indirectly connected to each other indirectly to transmit auxiliary signals, in order to support display devices. On the other hand, the data differential signal channels of the different communication interface are also connected to each other indirectly to transmit data differential signals, in order to support USB peripheral devices. Preferably, embodiments of the present invention simultaneously support USB peripheral devices and display devices, such as signal extenders, which are used by the host computer to remotely control USB peripheral devices and display devices.

Embodiments of the present invention are described in detail above. Those skilled in the art will be able to practice the invention without undue experimentation. In some embodiments, some well known structures and devices may not be included in the block diagrams. Other structures in addition to those shown in the drawings may be present as well and may be disposed between the components shown in the drawings. Further, additional input and output may be included as well although not shown in the drawings.

Some components that are shown as stand alone circuits may also be partly or completely incorporated in other circuits, so each element recited in the claims may correspond to one or more of the illustrated circuits or parts thereof.

Various components in the embodiments may be implemented by general or special purpose processors and computer programs which are stored in computer-readable memories and executed by processors. Various components may also be implemented in logic circuits.

One aspect of the present invention provides computer program products, including a computer usable non-transitory medium having a computer readable program code embedded therein for controlling a data processing apparatus, the computer readable program code configured to cause the data processing apparatus to execute the above-described processes. The computer usable medium may include, without limitation, flexible magnetic disks, optical disks, CD-ROMs, ROMs, RAMs, EPROMs, EEPROMs, magnetic or optical cards, flash memory, and other types of computer usable media. In additional, another aspect of the present invention includes downloadable computer program products which can be transmitted from a remote computer to a specified computer.

In this disclosure, when a component A is said to be coupled to or connected to a component B, it should be understood that component A may be directly coupled or connected to component B, or be coupled or connected to component B indirectly via a component C. When it is described that a component, characteristic, structure, program or property A causes a component, characteristic, structure, program or property B, it should be understood that A at least partly causes B, and it is possible that other component, characteristic, structure, program or property may also contribute to cause B. When the disclosure uses the word "may", the component, characteristic, structure, program or property is not limited to what is described in the disclosure. When the disclosure uses "a" or "one", the number is not limited to one.

It will be apparent to those skilled in the art that various modification and variations can be made in the devices and methods of the present invention without departing from the spirit or scope of the invention. Thus, it is intended that the present invention cover modifications and variations that come within the scope of the appended claims and their equivalents.

What is claimed is:
1. A circuit for transmitting both non-video signals and video signals, comprising:
  a first communication interface, coupled to an electronic device, for transmitting a first differential signal and a first auxiliary signal of a video signal;

a buffer module, coupled to the first communication interface;

a second communication interface, coupled to the buffer module, for transmitting a second differential signal; and a physical USB hub, having an upstream port coupled to the second communication interface and a plurality of downstream ports;

an emulator module comprising either logic circuits or a processor and a computer-readable memory storing computer programs capable of being executed by the processor, the emulator module having one end coupled to one of the plurality of downstream ports of the physical USB hub and another end configured to receive a second auxiliary signal of the video signal;

wherein data exchange for the first auxiliary signal of the video signal and the second auxiliary signal of the video signal is performed via the second communication interface between the buffer module and the emulator module.

2. The circuit of claim 1, wherein the buffer module includes:

a virtual hub unit comprising either logic circuits or a processor and a computer-readable memory storing computer programs capable of being executed by the processor, coupled to receive the first differential signal via the first communication interface;

a host controller, coupled to receive the second differential signal via the second communication interface; and a processor unit, coupled between the virtual hub unit and the host controller, and coupled to receive the first auxiliary signal via the first communication interface.

3. The circuit of claim 1, wherein the first auxiliary signal and the second auxiliary signal are auxiliary video signals of a Displayport interface.

4. The circuit of claim 1, wherein the second differential signal includes two types of packets, including:

converted first packets, wherein data in the first packets are unrelated to data of packets of the first differential signal; and forwarded second packets, wherein data in the second packets are the same as data of the packets of the first differential signal.

5. The circuit of claim 4, wherein the buffer module transmits the converted first packets via the second differential signal using time intervals of emulated scheduling for multiple USB devices, the converted first packets including data of the first auxiliary signal.

6. A device that supports both video interface and non-video interface, comprising:

a local module, coupled to an electronic device, the local module including:

a first buffer unit, coupled to a first non-video port and an auxiliary channel of a first video port of the electronic device; and a first transceiver module, coupled to the first buffer unit;

a remote module, coupled to multiple peripheral devices, the remote module including:

a second buffer unit, coupled to a second non-video port and an auxiliary channel of a second video port of the peripheral devices, which includes:

a physical USB hub unit, having an upstream port and a plurality of downstream ports, one of the plurality of downstream ports being coupled to a data differential channel of the second non-video port;

an emulation device unit comprising either logic circuits or a processor and a computer-readable memory storing computer programs capable of being executed by the processor, coupled to another one of the plurality of downstream ports of the physical USB hub unit; and a second processor unit, coupled to the emulation device unit and coupled to the auxiliary channel of the second video port; and a second transceiver module, coupled to the second buffer unit; and connection lines, coupled between the first transceiver module of the local module and the second transceiver module of the remote module, for transmitting signals.

7. The device of claim 6, wherein the first buffer unit includes:

a virtual hub unit comprising either logic circuits or a processor and a computer-readable memory storing computer programs capable of being executed by the processor, coupled to a data differential channel of the first non-video port;

a host controller, coupled to the first transceiver module; and a first processor unit, coupled between the virtual hub unit and the host controller and coupled to the auxiliary channel of the first video port.

8. The device of claim 6, wherein the first non-video port and the second non-video port are Universal Serial Bus (USB) ports.

9. The device of claim 6, wherein the connection lines include optical fiber connection lines.

10. The device of claim 6, wherein the auxiliary channel of the first video port and the auxiliary channel of the second video port are auxiliary channels of a Displayport interface.

11. The device of claim 7, wherein the local module further includes a first signal separation circuit, coupled between the first transceiver module and the host controller, for generating a first separated signal.

12. The device of claim 6, wherein the remote module further includes a second signal separation circuit, coupled between the second transceiver module and the physical hub unit, for generating a second separated signal.

13. A method for transmitting a video signal and a non-video signal, comprising:

a local module receiving a first differential signal and a first auxiliary signal of a video signal;

transmitting the first differential signal and the first auxiliary signal to a buffer unit;

the buffer unit generating a second differential signal based on the first differential signal and the first auxiliary signal;

transmitting the second differential signal to a remote module;

a physical USB hub unit of the remote module receiving the second differential signal at its upstream port and transmitting the second differential signal to a plurality of its downstream ports;

an emulation device unit of the remote module receiving USB signals from one of the plurality of downstream ports of the physical USB hub unit, the emulation device unit comprising either logic circuits or a processor and a computer-readable memory storing computer programs capable of being executed by the processor;

the emulation device unit receiving a second auxiliary signal of the video signal from a peripheral device; and exchanging data for the first auxiliary signal of a video signal and the second auxiliary signal of a video signal via the second differential signal between the buffer unit and the emulator device unit.

14. The method of claim 13, wherein the exchanging step comprises:
the emulation device unit transmitting converted packets via the second differential signal using time intervals of emulated scheduling for multiple USB devices, the converted packets including data of the first auxiliary signal.

15. The method of claim 13, wherein the exchanging step comprises:
the emulation device unit receiving converted packets via the second differential signal, and converting the converted packets back to the second auxiliary signal.

16. The method of claim 13, wherein the step of the buffer unit generating the second differential signal includes:
a first signal separation circuit separately processing the first differential signal as receiving differential signals RX and transmitting differential signals TX, wherein the first signal separation circuit is coupled between the buffer unit and the remote module.

17. The method of claim 13, wherein the step of the buffer unit generating the second differential signal includes:
a virtual hub unit of the buffer unit receiving the first differential signal, the virtual hub unit comprising either logic circuits or a processor and a computer-readable memory storing computer programs capable of being executed by the processor;
a processor unit of the buffer unit receiving the first auxiliary signal; and
a host controller of the buffer unit scheduling the first differential signal and the first auxiliary signal.

18. The method of claim 13, where the step of transmitting the second differential signal to the remote module is performed via connection lines.

* * * * *